United States Patent [19]
Bianco

[11] Patent Number: 5,232,652
[45] Date of Patent: Aug. 3, 1993

[54] METHOD OF MAKING A STATOR OF A MOTOR WITH PERMANENT MAGNETS EMBEDDED THEREIN

[75] Inventor: Carlo Bianco, Milan, Italy

[73] Assignee: Ricerca Elettromeccanica S.r.l., Milan, Italy

[21] Appl. No.: 913,443

[22] Filed: Jul. 14, 1992

[51] Int. Cl.⁵ .................... B29C 39/10; H02K 15/02
[52] U.S. Cl. .................... 264/263; 310/44; 29/598; 264/272.2
[58] Field of Search ............ 310/44, 42, 46, 254, 310/256, 261, 154; 29/596, 598; 264/263, 272.19, 272.2

[56] References Cited

U.S. PATENT DOCUMENTS

| | | |
|---|---|---|
| 3,723,795 | 3/1973 | Baermann .................... 310/93 |
| 4,578,610 | 3/1986 | Kliman et al. .................... 310/156 |
| 4,950,438 | 8/1990 | Nakamura et al. .................... 264/272.2 |
| 4,981,635 | 1/1992 | Yamashita et al. .................... 264/112 |
| 5,088,902 | 2/1992 | Marioni .................... 417/415 |
| 5,117,141 | 5/1992 | Hawsey et al. .................... 310/114 |
| 5,149,483 | 9/1992 | Okey et al. .................... 264/272.2 |

Primary Examiner—Steven L. Stephan
Assistant Examiner—Matthew Nguyen
Attorney, Agent, or Firm—Notaro & Michalos

[57] ABSTRACT

Permanent magnets are mounted onto a punch, wherein the punch and associated magnets are fitted into a die which is then filled with a mixture of metal powder and thermosetting resin, in order to obtain, in a single operation, a stator having the permanent magnets embedded therein and being, integral with the body of a reduction unit connected to the motor.

5 Claims, 1 Drawing Sheet

METHOD OF MAKING A STATOR OF A MOTOR WITH PERMANENT MAGNETS EMBEDDED THEREIN

FIELD AND BACKGROUND OF THE INVENTION

This invention relates to a method of making components for electric motors, in particular a method which utilizes the powder technology to make by a single operation and depending on the type of concerned motor, the body of the stator, or the rotor, which has the permanent magnets embedded therein. Said body may be integral with the casing of a reduction unit or other device to be connected to the motor.

A metal powder with an admixed thermosetting resin is filled in a die in which a punch having the shape of the rotor (in case of d-c motor) has previously been inserted and to which the magnets have been fitted so that these will remain embedded in the stator.

While the specific case of a d-c motor will be referred to in the following description, it is to be understood that the same solution may apply as well to the manufacture of different types of electric motors, such for example, the brushless type.

As is usual for known d-c motors, the stator in these motors generally comprises an external iron sheet frame that, in case of small sized motors, such as those used for small electro-domestic appliances, has frequently been obtained by drawing.

This stator is fitted with permanent magnets that are secured to its frame by means of elastic springs made of steel or the like.

However, this method suffers from some inaccuracy due to various allowances that may add to one another and are related to the magnet thickness, diameter and linearity, the drawing diameter and linearity, for stators made by this process, or the frame winding diameter and related linearity, for stators made by pressing.

In order to avoid any possible interference between the rotor and the magnets when these allowances add to one another, it has been necessary to provide in presently used motors a rather wide gap between said components, which results in a lower motor efficiency that is obtainable when the distance of the magnets from rotor is minimized.

A similar problem arises when making rotors for brushless motors.

On the other hand, production cost is to be controlled and this has kept from having recourse to more elaborate and accurate manufacturing techniques.

In view of the above, it would be desirable that means are provided which enable said gap to be minimized without increasing production cost, thereby to obtain motors of higher power than presently used motors with the size and production costs being the same.

SUMMARY OF THE INVENTION

To this end, the invention provides a method of making parts for electric motors which utilizes the metal powder technology to form a stator or a rotor, as the case may be.

In particular, according to the method of this invention for making, for example, a d-c motor, a punch corresponding in shape to the rotor and having the magnets fitted thereto, is inserted in a die which has the external shape of the stator.

The gap between the die and the rotor is filled with a mixture of metal powder and epoxy resin, and a pressing force is applied thereto so that the stator with the magnets already fitted to it is obtained by a single operation.

This method permits a stator unit to be produced which is high in accuracy and very much reduced in cost.

BRIEF DESCRIPTION OF THE DRAWINGS

The above and other advantages of this invention will become more apparent from a reading of the following detailed description, reference being made by way of example to the accompanying drawing, in which.

DESCRIPTION OF THE PREFERRED EMBODIMENTS

Figure 1:
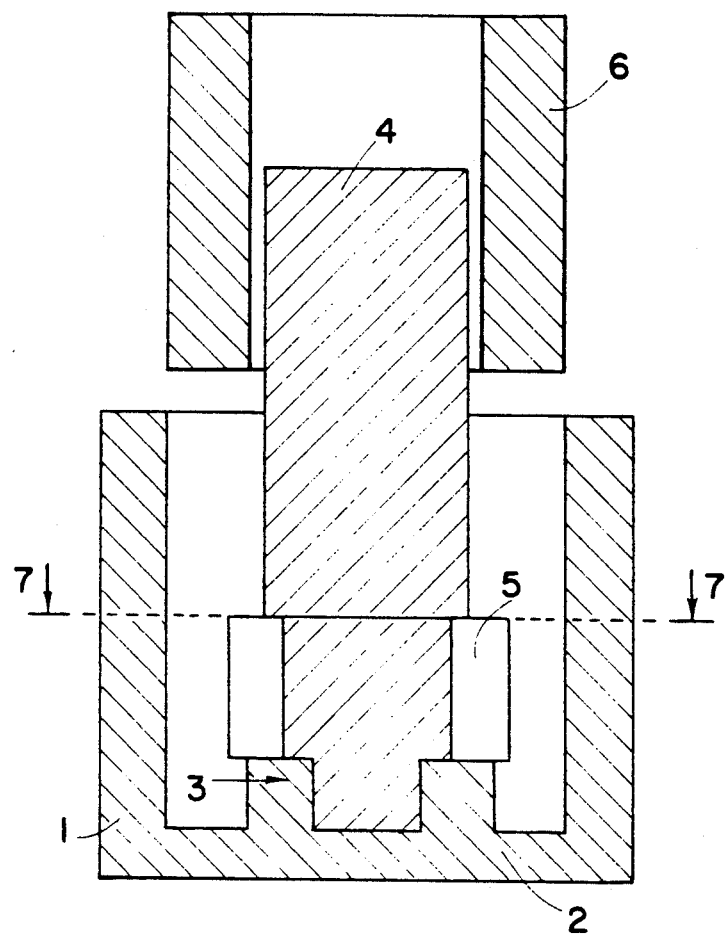
FIG. 1 is a sectional view of a die during the step of making a stator of a d-c motor by the method according to this invention.
Figure 2:
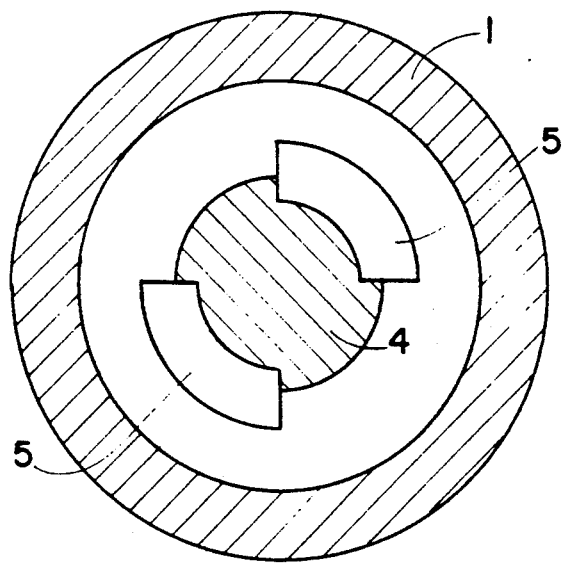
FIG. 2 is a sectional view taken along line 7—7 in FIG. 1.

Referring now to FIG. 1, there is shown a die 1 consisting of a cylinder ring closed at a bottom wall 2 and having an inside diameter corresponding to the outside diameter of a stator to be produced.

An annular projection 3 is provided on the bottom wall 2 and defines a recess for receiving and closely locating a pivot or support 4 that is fitted into the die to form the stator.

The support 4 is also cylindrical in shape and has a diameter corresponding to the inside diameter of the stator.

Mounted to the support 4 are permanent magnets 5 that are designed to remain embedded in the stator.

To this end, the magnets 5 are received in corresponding recesses in support 4, the walls of these recesses defining together with the projection 3, the locating means for accurate positioning of the magnets in the inside of the die.

A mixture of iron powder and epoxy resin is filled in the gap between the die walls and the support 4 and is subsequently compacted by a pressing punch 6 which is arranged to slide in a parallel direction to the die axis.

The powder and resin mixture is pressed until such a sufficient compactness and density thereof is attained as to permit the support 4 to be withdrawn and, thereafter, the die to be removed, thereby to have the stator frame with the magnets being embedded and accurately positioned in the stator.

A subsequent heat treatment at low temperature will cause the epoxy resin to polymerize, thereby to bind the iron powder particles together so as to give compactness and mechanical strength to the stator as required for use.

According to a preferred embodiment of this invention the powder material can be subjected to isostatic pressing.

In this case, the magnets are again mounted to a support of the type as referred to before, the assembly is fitted into an elastic membrane and, after a metal powder and resin mixture has been filled in the gap between the membrane and the internal support, a pressing force is applied thereto in a radial direction.

By the described solution, an extremely accurate construction is obtained due to both the powder technology employed which permits production to be performed within very close allowances, and the fact that allowances can be reduced in number since a single operation is sufficient to form the product.

The present invention provides significant advantages:

First, the gap between the rotor and the stator can be substantially reduced, thereby improving efficiency of the motor and, as a result, enabling motors of smaller size to be utilized.

Second the stator of the motor can be formed integral with the body of any accessory device, such as a mechanical reduction unit or a transmission, which is usually coupled to this type of motor.

Third finished mechanical parts of high dimensional accuracy are obtained which permit, therefore, any further machining operation to be dispensed with.

Fourth nonground, lower cost permanent magnets can be used, since these magnets will be carefully pozioned by using, as a locating device, a support whose dimensions equal the inside dimensions of the stator.

Similarly, in making a brushless motor, the magnets are fitted to a die having the shape of the stator, powdered material is filled in between, and a pressing force is applied so as to obtain the rotor with the magnets embedded therein.

It should be apparent to any person skilled in the art that many modifications may be thought and will fall within the scope of this invention, which is defined in the appended claims.

I claim:

1. A method of making a stator having an inside diameter and an outside diameter, for an electric d-c motor comprising the steps of:
    mounting a plurality of permanent magnets on a cylinder support having a diameter which is the same as the inside diameter of the stator;
    fitting said support with said magnets into a die having an inside diameter equal to the outside diameter of the stator, there being a gap between said support and the die;
    filling the gap between said support and said die with a mixture of a metal powder and a binder; and
    pressing said metal powder and binder mixture by a pressing punch so as to obtain a stator with the permanent magnets embedded therein.

2. The method according to claim 1, wherein the die has a bottom wall with an annular projecting thereon, the method utilizing the annular projection on a bottom wall of said die to center said support for the permanent magnets and to serve as a locating member for precise positioning of said magnets.

3. The method according to claim 1, wherein said mixture comprises a powdered metal and a thermosetting epoxy resin.

4. The method according to claim 3 wherein the stator is made integral with a casing of a mechanical unit to be coupled to the motor.

5. A method of making a stator for an electric d-c motor, the stator having an inside and an outside diameter, the method comprising:
    mounting permanent magnets on a cylinder support having a diameter the same as the inside diameter of the stator;
    fitting said support and magnets into a die having an inside diameter equal to the outside diameter of the stator; there being a gap between the support and the die;
    filling the gap between said support and said die wit a mixture of metal powder and a binder; and
    sintering said metal powder and binder mixture so as to obtain a stator with the permanent magnets embedded therein.

* * * * *